US011853786B2

(12) United States Patent
Chen et al.

(10) Patent No.: US 11,853,786 B2
(45) Date of Patent: *Dec. 26, 2023

(54) PERFORMANCE OF CONTAINERS

(71) Applicant: International Business Machines Corporation, Armonk, NY (US)

(72) Inventors: Qin Yue Chen, Shanghai (CN); Shu Han Weng, Beijing (CN); Yong Xin Qi, Beijing (CN); Zhi Hong Li, Beijing (CN); Xi Xue Jia, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 322 days.

This patent is subject to a terminal disclaimer.

(21) Appl. No.: 17/350,813

(22) Filed: Jun. 17, 2021

(65) Prior Publication Data
US 2021/0311771 A1 Oct. 7, 2021

Related U.S. Application Data

(63) Continuation of application No. 16/044,990, filed on Jul. 25, 2018, now Pat. No. 11,055,127.

(51) Int. Cl.
*G06F 9/455* (2018.01)
*G06F 16/17* (2019.01)

(52) U.S. Cl.
CPC ...... *G06F 9/45558* (2013.01); *G06F 16/1734* (2019.01); *G06F 2009/45562* (2013.01)

(58) Field of Classification Search
None
See application file for complete search history.

(56) References Cited

U.S. PATENT DOCUMENTS 10,649,861 B1 * 5/2020 Natanzon ............... H04L 12/66
2012/0323859 A1 12/2012 Yasa et al.
(Continued)

FOREIGN PATENT DOCUMENTS

CN 105893205 8/2016

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.
(Continued)

*Primary Examiner* — Wynuel S Aquino
(74) *Attorney, Agent, or Firm* — Edward Wixted; Rachel L. Pearlman, Esq.; Heslin Rothenberg Farley & Mesiti PC

(57) ABSTRACT

A method, computer program product, and a system where a processor(s), in a computing environment comprised of multiple containers comprising modules, includes a processor(s) parsing a module originating from a given container in the computing environment by copying various identifying aspects of a module file comprising the module and calculating, based on contents of the module file, a digest value as a unique identifier for the module file. The processor(s) stores the various identifying aspects of the module file and the digest value in one or more memory objects, wherein the one or more memory objects comprise a module content map to correlate the unique identifier for the module file with the contents of the module, images in the module file with the unique identifier for the module file, and layers with the unique identifier for the module file.

20 Claims, 8 Drawing Sheets

(56) References Cited

U.S. PATENT DOCUMENTS

| | | | |
|---|---|---|---|
| 2017/0126506 A1 | 5/2017 | Padala et al. | |
| 2017/0264684 A1* | 9/2017 | Spillane et al. | |
| 2017/0315795 A1* | 11/2017 | Keller | G06F 11/3006 |
| 2017/0339178 A1* | 11/2017 | Mahaffey | H04L 41/142 |
| 2018/0048545 A1* | 2/2018 | Mishalov | G06F 11/302 |
| 2019/0347127 A1* | 11/2019 | Coady | G06F 8/63 |
| 2020/0019623 A1* | 1/2020 | Wong | G06F 16/137 |
| 2020/0034170 A1 | 1/2020 | Chen et al. | |
| 2020/0117642 A1* | 4/2020 | Bhandaru | G06F 12/1408 |

OTHER PUBLICATIONS

Dua et al., "Perfomance Analyis of Union and Cow File Systems With Docker", May 1, 2017, http://ieeexplore.ieee.org/document/7915029/, 3—pages.

Casalicchio et al., "Measuring Docker Performance: What A Mess !!! "http://research.spec.org/icpe_proceedings/2017/companion/p11.pdf, 6—pages.

Docker, "Copy File From Container to Host", https://stackoverflow.com/questions/22049212/docker-copy-file-from-container-to-host, 4 pages.

List of IBM Patents or Patent Applications Treated as Related, Jun. 23, 2021, 2 pages.

* cited by examiner

| Module Identifier - Module Content Table ||
|---|---|
| Module Identifier | Module content |
| 2930ba7ca024 | *Module Object* Ref 0x10002301<br>*Module Path:* /usr/bin/sort<br>*Symbols:* .sort    0x100 - 0x200<br>*Instr Bytes:* 1AF123AFECB123901238ACB123 ...<br>*Source Line* .check    0x200 - 0x250.compare. 0x250 - 0x300 |

FIG. 7

| Image-Module Identifier Table | | |
|---|---|---|
| Image ID | Module Path | Module Identifier |
| 44a8e1a5c0b2 | /usr/bin/sort | 2930ba7ca024 |
| e3b89ca710c3 | /usr/lib/libc.so | d9ee8416b58b |
| 8e1a5c0999b2 | /usr/lib/libm.so | 62a932a5c143 |

FIG. 8

| Layer-Module Identifier Table | | |
|---|---|---|
| Layer ID | Module Path | Module Identifier |
| 9b5e4968c1511225d49094d7963df49eff1ca4add8bb15aa57ad7f2fc2a2c3cc | /usr/lib/libm.so | 62a932a5c143 |
| ebe780cbbabbd3029c200ee0c4989730a9949743696266255f1acc3382656da3 | /usr/lib/libm.so | 8b2eaf28bb84 |
| dd133d6fa27bad178f4a5bae932aebcab444a2c004f3a183dee6861aa91ba73f | /usr/lib/libm.so | 62a932a5c143 |

FIG. 9

| Image Relationship Table | | |
|---|---|---|
| Image ID | Image 2 | Common Top Layer |
| 44a8e1a5c0b2 | e3b89ca710c3 | ebe780cbbabbd3029c200ee0c4989730a9949743696266255f1acc3382656da3 |

FIG. 10

PERFORMANCE OF CONTAINERS

BACKGROUND

A container image is a lightweight, stand-alone, executable package of a piece of software that includes everything needed to run it: code, runtime, system tools, system libraries, and settings. Referred to as docker containers (docker being the name of a specific container platform), containerized software is available for both Linux and Windows based applications and provides consistency, regardless of the environment, because containers isolate software from its surroundings. This advantageous isolation renders containerized software useful in technical environments, where isolation is utilized, for example, in designated development and staging environments. Utilizing containers in these environments assists in reducing conflicts when different users are running different software (e.g., a development version vs. a staged version) on the same technical infrastructure. Docker containers may be considered lightweight, standard, and/or secure. A lightweight docker container runs on a single machine and shares the machine's operating system kernel. The software contained in the lightweight docker will start executing instantly and therefore, use less computer and random access memory (RAM). This version is considered "lightweight" because processors in the computing environment construct images from file system layers and share common files to minimize disk usage, and increase the speed of image downloads. Meanwhile, standard docker containers are so-called in part because they are based on open standards and run on all infrastructures that include virtual machines (VMs), including, but not limited to, Linux, Microsoft Windows, and bare metal (e.g., in cloud computing systems). Docker containers are considered secure because, as aforementioned, docker containers isolate applications from one another and from the underlying infrastructure. Thus, utilizing a docker provides a default isolation that limits application issues to a single container, instead of the entire machine.

Dockers differ from VMs. Dockers are containers that are an abstraction at the application layer that packages code and dependencies together. Multiple containers can run on the same machine and share the operating system (OS) kernel with other containers, each running as isolated processes in user space. Containers take up less space than VMs (container images are typically tens of MBs in size), and start almost instantly. Meanwhile, VMs are an abstraction of physical hardware, i.e., turning one server into many servers. A hypervisor allows multiple VMs to run on a single machine. Each VM includes a full copy of an operating system, one or more applications, necessary binaries and libraries, which utilizes tens of GBs. Thus, VMs can be slow to boot.

In various computing environments into which docker containers are deployed, performance sampling is desirable in order to identify how an application's performance is affected by critical changes in topology, code and attributes. As continuous delivery models are generally favored, container monitoring and sampling provide insight into the impact of changes on application performance within context of various tasks and activities. Changes to application code, infrastructure, and topology can be tracked across time, enabling a user to pinpoint and prevent problems, as well as identify conditions that correlate to increased performance. In most computing environments, program code executed by a processing resources that samples data collected this data at the OS and/or machine level; the data collected is statistical data about the workload that is performed by an application. Samples may include a process identifier (PID) and instruction address information. The program code utilizes a MAP file to locate the sample to process/thread/module. To drill down further, the program code can utilize an Executable and Linkable Format (ELF, formerly named Extensible Linking Format) image to obtain symbols in the module and instruction bytes of the symbol. Program code in sampling tools can get the path of modules/executables from memory, but sometimes the path is relative path instead of absolute path. Then, utilizing existing tools, the user must specify the search path. Relative paths can lead to different docker containers and existing tools cannot access modules which belong to different docker containers (with paths in the docker union file system instead of path in the host file system). Sampling tools cannot load the ELF images of these files.

Because of the multiple docker containers deployed in a cloud computing environment, and the prevalence of relative paths and virtual resources in this type of environment, performance sampling or scanning in a cloud computing environment presents a unique challenge and an environment in which existing performance sampling tools are either inoperable or ineffective. Thus, there is presently no solution for performance sampling for a cloud container (a container deployed in a cloud computing environment). In addition to the challenges related to the user of different containers discussed above, the complexity and expansive nature of cloud computing environments also complicate sampling because it is not possible to parse module files and keep modules for thousands of containers without adversely affecting the performance for the users of the resources of the cloud. Performance is critical for cloud platform as resources, performance and cost are a main competency for cloud-based offering. Thus, the challenges to performance scanning in a cloud computing environment are both logistical and performance related.

SUMMARY

Shortcomings of the prior art are overcome and additional advantages are provided through the provision of a method for performance sampling a computing environments executing applications from multiple containers. The method includes, for instance: parsing, by one or more processors, in a computing environment comprised of multiple containers comprising modules, a module originating from a given container in the computing environment, the parsing comprising; copying, by the one or more processors, various identifying aspects of a module file comprising the module; and calculating, based on contents of the module file, a digest value as a unique identifier for the module file; and storing, by the one or more processors, the various identifying aspects of the module file and the digest value in one or more memory objects, wherein the one or more memory objects comprise a module content map to correlate the unique identifier for the module file with the contents of the module, images in the module file with the unique identifier for the module file, and layers with the unique identifier for the module file.

Shortcomings of the prior art are overcome and additional advantages are provided through the provision of a computer program product for performance sampling a computing environments executing applications from multiple containers. The computer program product comprises a storage medium readable by a processing circuit and storing instructions for execution by the processing circuit for performing a method. The method includes, for instance: parsing, by one or more processors, in a computing environment comprised of multiple containers comprising modules, a module originating from a given container in the computing environment, the parsing comprising: copying, by the one or more processors, various identifying aspects of a module file comprising the module; and calculating, based on contents of the module file, a digest value as a unique identifier for the module file; and storing, by the one or more processors, the various identifying aspects of the module file and the digest value in one or more memory objects, wherein the one or more memory objects comprise a module content map to correlate the unique identifier for the module file with the contents of the module, images in the module file with the unique identifier for the module file, and layers with the unique identifier for the module file.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 7 depicts various aspects of some of embodiments of the present invention;

FIG. 8 depicts various aspects of some of embodiments of the present invention;

FIG. 9 depicts various aspects of some of embodiments of the present invention;

FIG. 10 depicts various aspects of some of embodiments of the present invention;

DETAILED DESCRIPTION

Figure 1:
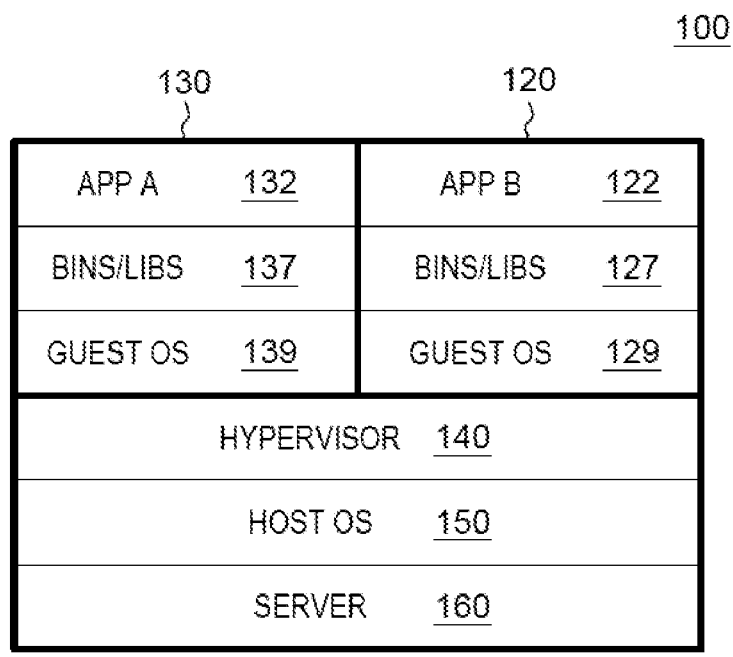
FIG. 1 is an illustration of various aspects of an environment dissimilar to one in which aspects of embodiments of the present invention may be implemented.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 11:
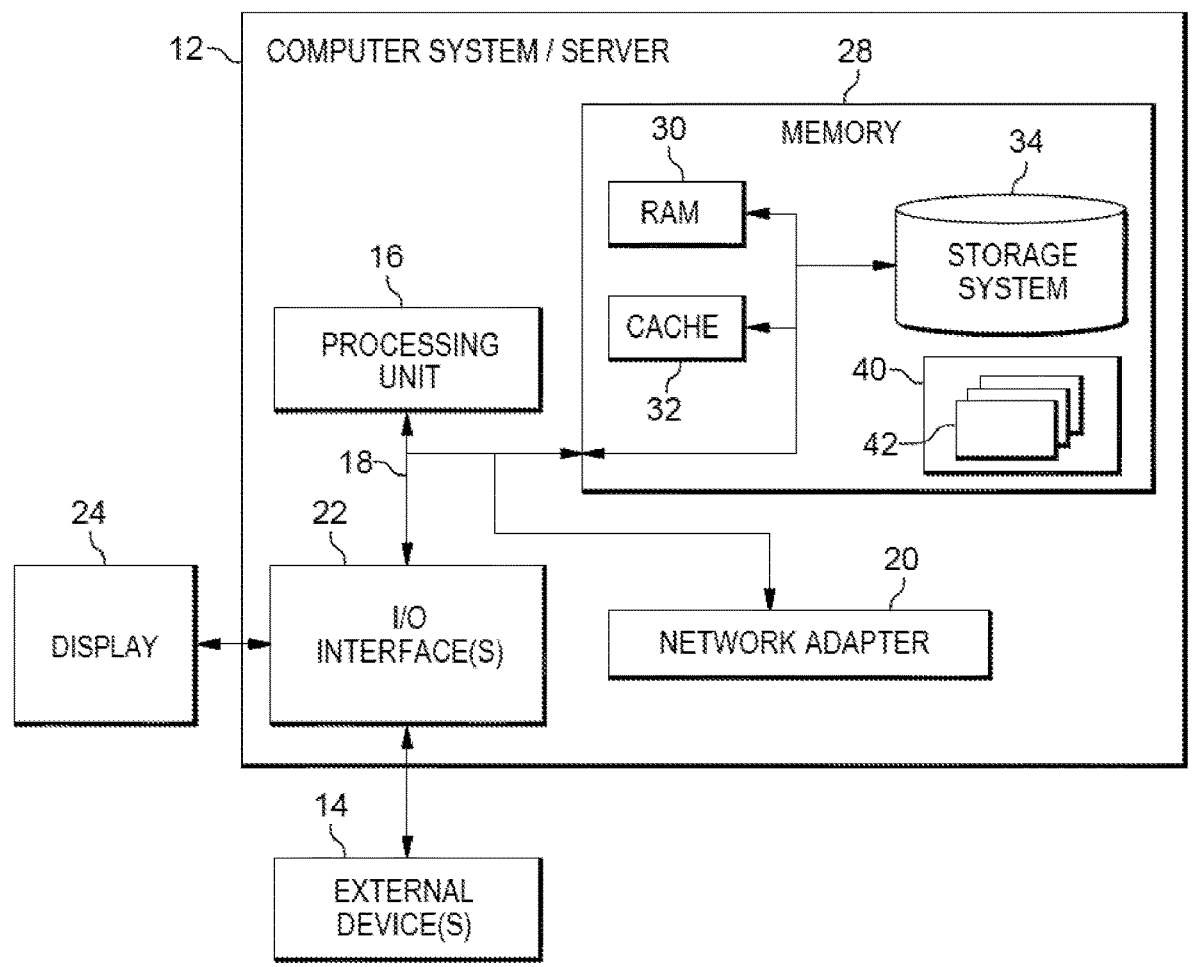
FIG. 11 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 11 as program/utility 40, having a set (at least one) of program modules 42, may be stored in memory 28.

Embodiments of the present invention include a computer-implemented method, a computer program product, and a computer system that include program code executed on at least one processing circuit that provides container performances sampling in a shared distributed computing environment (e.g., where the production docker hosts contains thousands of containers), including in a cloud computing environment. In some embodiments of the present invention, the program code obtains a digest value of a module file to utilize as unique module identifier, based on an inheritance relationship of images and layers, to avoid duplicate work and resource overhead involved in repeatedly processing the same modules, given the potential for duplication in a distributed shared (e.g., cloud) computing environment. A module file can be a shared/static library or an executable binary file. The duplicated work avoided includes, but is not limited, to parsing the duplicative modules, copying the duplicative module files, calculating digest values of the duplicative modules, and keeping the duplicative module content in memory, including storing the resultant duplicative files, etc. Thus, utilizing digest values of module files as module identifiers avoids the program code repeatedly parsing same module file and keeping multiple copies of module. The program code also utilizes an image-module identifier table to avoid copying the same files and calculating the module identifier multiple times for containers using same images. Thus, in some embodiments of the present invention, the program code: 1) obtains a module identifier by utilizing an image identifier and a module path; and 2) looks up the module by parsing a result from a module identifier-module table. The program code also avoids duplication (given the commonality of files and images in different containers across the shared computing environment) by utilizing a layer-module identifier table to avoid copying the same files and calculating a module identifier multiple times, for containers using same image layers. To avoid this duplication, the program, code: 1) finds a module identifier list utilizing a module path; parses layer identifiers of images from top to bottom; 3) locates (i.e., stops parsing when) a layer is matched; and 4) utilizes an image relationship table to avoid searching the same files in a common layer stack, which are shared between images enabling usage of a result from image with common layers directly. Utilizing the relationship table provides a shortcut for searching files across layers.

Embodiments of the present invention provide advantages over existing methods of performance sampling, especially when utilized in distributed computing environments, such as cloud computing environments. Existing performance sampling tools do not provide a solution for performance sampling across distributed shared computing systems, including but not limited to, cloud computing systems. Implementing existing performance sampling tools in cloud computing environments does not provide an effective performance sampling solution at least because a production docker host, in this type of environment, contains thousands of containers, and each containers utilizes its own union file system, instead of a host file system. Thus, these existing solutions are unable to obtain a module file from the host system file. One reason for this difficulty is that copy on-wrote (COW) technology and random layer identification (ID) renders locating the module difficult. Thus, the existing approach, which is a workaround that is scarcely utilized due to its negative impacts on performance, is the a docker application programming interface (API) that is utilized to obtain a module file copy from a container union file system. However, utilizing these copies requires intensive processing and is also memory intensive because using this approach it requires repeatedly parsing and retaining often duplicate copies of modules for thousands of containers. This requirement strains system limits as in many computing environments it is not possible to parse module files and keep modules for thousands of containers. When performance is impacted this heavily in a cloud computing environment, the approach is not feasible because performance is critical for cloud platform resources (i.e., performance and cost are a main competency for cloud-based offerings).

Embodiments of the present invention provide an approach to performance sampling without rendering the platform (e.g., shared computing environment, cloud computing environment) inoperable for its intended use by adversely affecting performance. Among the advantages of aspects of various embodiments of the present invention are that these aspects provide performance sampling avoid copying modules, which creates overhead and avoids parsing module binary files with same content. In embodiments of the present invention, before parsing module library, program code executed by a processing resource, calculates a digest value of a module binary file, and saves the digest value of module binary file as module identifier, and saves the parsed module content as value to in the parsed module map. By saving these values, the program code can determine that a given module has already been parsed and can ensure that a file with duplicative content will not be parsed. In embodiments of the present invention, the program code saves overhead when locating module files, which include binary files, by being able to compare content between files, which are from same image/layer, but from different containers. If a module file is not modified, after the program code parses the module, the program code adds a record to an image-layer-module. Identifiers in the record created by the program code may include, but are not limited to: an identifier for the image, an identifier for the topmost layer, a module path, and/or a hash value of module file. This approach preserves overhead because when there is another module file from same image or same layer but different container, the program code obtains the module hash value from image-layer-module table, directly, instead of locating the module again.

Embodiments of the present invention are inextricably tied to computing at least because aspects of the given invention address an issue that is unique to computing, i.e., performance sampling in a distributed computing environment (e.g., a cloud computing environment) that includes multiple containers, each with its own union file system, instead of the host file system. Aspects of the present invention provide performance sampling without the duplicative processing of existing approaches that render existing performance sampling unusable in a technical environment with these multiple containers.

Figure 2:
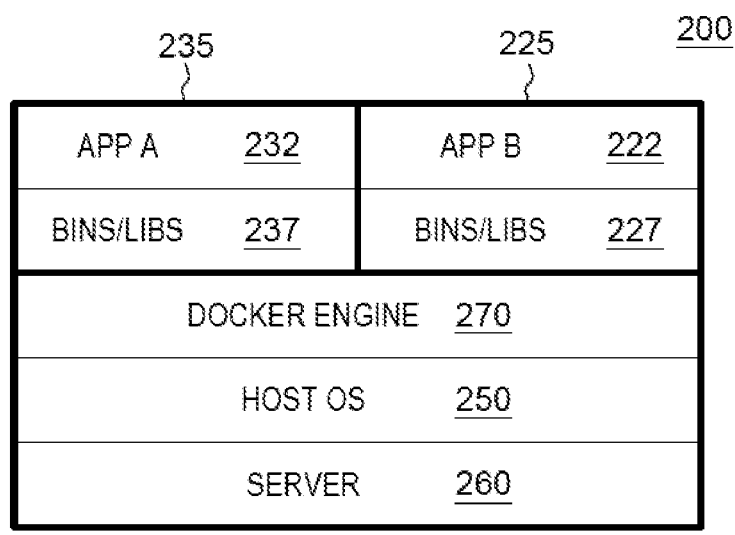
FIG. 2 is an illustration of various aspects of an environment in which aspects of embodiments of the present invention may be implemented.
Figures 3, 4:
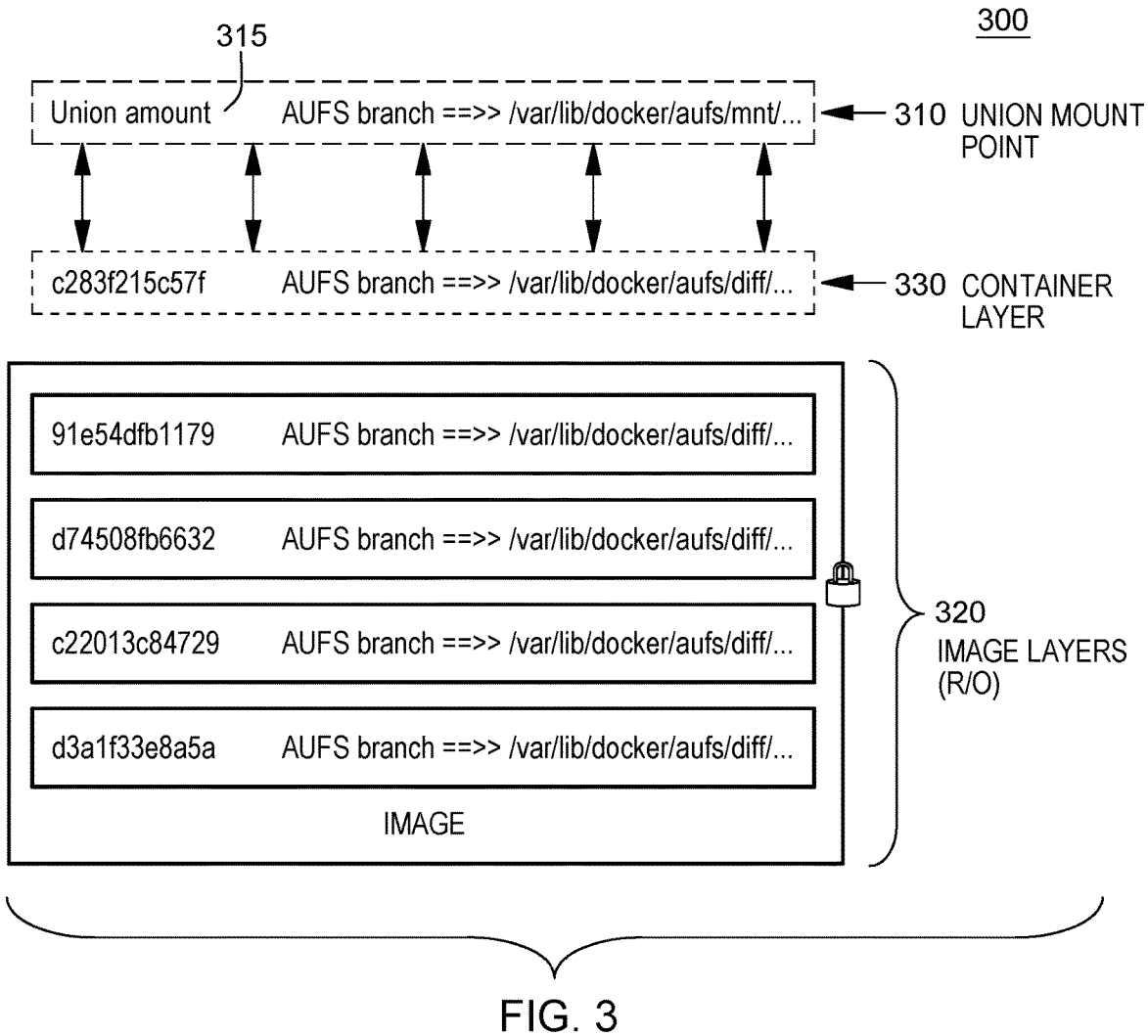
FIG. 3 is an illustration of various aspects of an environment in which aspects of embodiments of the present invention may be implemented.
FIG. 4 is an illustration of various aspects of an environment in aspects of embodiments of the present invention may be implemented.

Before discussing the particulars of embodiments of the present invention (i.e., a computer-implemented method, computer program product, and computer system, which provide performance sampling in complex computing environments, including cloud computing environments), FIGS. 1-3 are provided to illustrate the utilization of containers and to provide insight into performance sampling challenges address by embodiments of the present invention.

FIG. 1 illustrates a virtual machine (VM), which can be contrasted with the docker container, illustrated in FIG. 2. FIG. 1 depicts two VMs 120 130 executing on a host 100 and FIG. 2 depicts two containers 225 235 executing on a host 200. As depicted in FIG. 2, a container 225 235, unlike a VM 120 130 (FIG. 1), does not provide hardware virtualization. A container provides operating-system-level virtualization by abstracting the user space.

FIG. 1 depicts two virtual machines 120 130 executing on a host 100. Each virtualized application, i.e., VM 120 130, includes an application 122 132, dependencies utilized by the application (e.g., binaries and libraries 127 137) and a guest operating system 129 139. The VMs 120 135 are managed by a hypervisor 140, which is executed on the host operating system 150, executed by the processing resources of the host server 160. A VM can take up considerable space as its application and dependencies can utilize tens of GB, as can the guest operating system.

FIG. 2 uses the docker engine 270 and docker containers 225 235 as specific examples of a container engine and a container, respectively, for illustrative purposes, only. Aspects of some embodiments of the present invention can be utilized across a broad range of container technologies.

Turning to FIG. 2, a given container 235 effectively shares a kernel of a host 200 operating system (OS) 250 with other containers (e.g., container 225). Containers 225 235 have private spaces for processing, can execute commands as root, have a private network interface and internet protocol (IP) addresses, allowing custom routes and iptable rules, and can mount file systems. Each container 225 235 has its own file system and root path, though the containers shares the kernel of a host 200. As illustrated in FIG. 2, each docker container 225 235, executed by a docker engine 270, comprises just one application 222 232 and its dependencies, e.g., binaries and/or libraries 227 237. Each docker container 225 235 runs an isolated process in userspace on the host operating system 250, executing on a host 200 server 260. The containers 225 235 enjoy the resource isolation and allocation benefits of VMs, but are more portable because they utilize a kernel of the host 200, upon which their contents are executed. Although a native machine can support only dozens of VMs, but it can support thousands of containers. For mainframe machines like LinuxONE, there is very high possibility of having thousands of containers on one machine.

FIG. 3 illustrates single unified view of layers 300 that represent a (docker) container image. In a container, each image references a list of read-only layers that represent filesystem differences. Layers are stacked on top of each other to form a base for a container's root filesystem. A docker storage driver is responsible for stacking these layers and providing the single unified view 300. When program code adds a new container to be executed on a host computing system, the program code is adding a new, thin, writable layer on top of an underlying stack, referred to as a container layer. During runtime, all changes made to the container (e.g., writing new files, modifying existing files, and deleting files), are written by the program code to the container layer.

FIG. 3 illustrates single unified view of layers 300 based on the advanced multi-layered unification filesystem (AUFS), a system that implements a union mount 315 (at a union mount point 310) for Linux file systems. A unification file system, of which AUFS is one example, takes multiple directories on a single (e.g., Linux) host, stacks them on top of each other, and provides a single unified view 300 by utilizing the aforementioned union mount 310. In AUFS, the individual image layers 320, which are read-only, and the container layer 330, to which changes can be written during runtime, are represented in the Docker hosts filesystem as a directory (e.g., under/var/lib/docker/). The image identifiers may or may not correspond to the names of the directories that contain their data, depending upon the implementation of the container system.

In technical environments that do not include the challenges of distributed computing environments (e.g., cloud computing environment) program code samples containers by collecting statistical data about the work that is performed by an application (of the container) during a profiling run. The sampling method is lightweight and includes the following activities: 1) the program code samples instruction addresses on-the-fly; 2) the program code collects the instruction addresses to determine a process/module/symbol mapping relationship; and 3) post-processing, the program code locates instruction addresses in their own processes/modules/symbols. Utilizing this framework, in these non-complex technical environments, existing performance sampling tools: 1) collect instructions at a predetermined interval; 2) collect a MAP file with module/symbol address information; and 3) during post-processing step, locate the instruction address by module/symbol utilizing an address range.

Instruction address records may include the following information: 1) Instruction address; 2) Process ID (Address space ID), which can be utilized by the program code to determine the process (i.e., address space) in use; 3) hardware/software counter(s) information.

Below is an example of a MAP file:
Process/abc/app PID 0x23
Module/lib/Math.so (0x1000-0x2000)
    Symbol abs(0x1010-0x1080)
      Instruction add (0x1020)
      Instruction branch (0x1024)
    Symbol square (0x1100-0x1200)

When program code samples a record whose instruction address 0x1024 and PID 0x23, Proces 0x23, module Math, Symbol abs, instruction branch (0x1024) is hit, generating statistics of the hot code.

In cloud computing environments and other complex computing environments where the paths of the modules belong to different containers, traditional sampling tools cannot effectively performance sample the containers. In less complex computing environments (not shared computing environments, such as cloud computing environments) a sampling tool can facilitate the execution of processes utilizing modules in the process, from memory. However, in these existing tools, in order to facilitate execution, the program code load the binary file (e.g., ELF image) to determine the symbols in the module and instruction bytes of the symbol. This process only works if the sampling tools can acquire the path of modules/executables from memory, but if the path is relative path, instead of absolute path, the program code must specify the search path instead. The program code collects data (to sample the data, for performance sampling) at an operation system level or at a machine level. In a container environment (e.g., FIG. 2), the program code collects sampling data in a host environment. From the host environment, the program code of the sampling tool obtains a process list, as well as data, indicating the modules utilized in the processes. However, in systems utilizing different containers, such as cloud computing systems, the paths of the modules belong to different containers are in a docker union file system, instead of in a path in the host file system. Thus, the program code of existing sampling tool cannot load the ELF images with these paths, in the host environment.

FIG. 4 illustrates the unique challenges of performance sampling in an environment that includes different containers. In FIG. 4, each process, referred to as a "peer," belongs to a different container. If this process belongs to a host OS, program code of a sampling tool will search the executable "peer" in the directories specified by "PATH" and "LD_LIBRARY_PATH." However, if the processes are executed from a (e.g., docker) container, each process (i.e., peer command) is executed from its own file system (e.g., FIG. 2, 227, 237). Thus, each peer command can be in a "/usr/bin" directory, but each container has its own system. Thus, each peer command can be in /var/lib/docker/containers/123213123213123adfdsa/usr/bin or in /var/lib/docker/containers/41243212132131321321/usr/bin, in the host environment. Thus, without user interactions, the sampling tool cannot load the ELF images.

Further complicating sampling in environments with different containers, although, traditional sampling methods can continue performance sampling, even if paths are relative and not absolute, these workarounds do not work in the presence of multiple containers. For example, in traditional environments without the multiple containers, program code in a sampling tool can prompt a user to suggest an absolute path, and then the program code of the tool, based on the user response, will attempt to locate the module with a concatenation of path (e.g., the user-provided path+the relative path). The program code of the sampling tool may also request, from the user, a search path to search binary files. Responsive to the user inputs, the program code of the sampling tool will attempt the file name in these directories, one by one. However, for a variety of reasons, some of which are enumerated below, these workarounds are ineffective in an environment with multiple containers. Reasons that render these approaches ineffective include: 1) difficulties in locating a binary file in host environments directly; 2) the abundance of effort (causing inefficiencies) required to specify, manually, and search paths for each container; and 3) limitations in container compatibility as containers are designed to support certain functions (and are therefore not ideal for implementing originally unanticipated functionality) and map tools are not compatible with these containers. Regarding the first challenge, multiple containers are in a host environment and there may be thousands of docker container in one operating system. Regarding the second issue, as there are many docker containers in one operating system, containers may use same shared object/executable file, but from different file path, thus, it is inefficient for program code to load and keep duplicative copies of library files (e.g., libc.a). Regarding the third issue, many map tools cannot access containers directly because this functionality was not anticipated.

In embodiments of the present invention, utilizing a process identifier (process ID), program code, executing on at least one processing resource, identifies the container that owns each module. The program code locates each module's binary file, from each container, by utilizing a module path, instead of locating the module from the host file system, directly. By utilizing the process ID in this manner, the program code accesses module binary files in a container layer (e.g., FIG. 3, 330) and in an image layer (e.g., FIG. 3, 320), using an image-layer-module, to avoid parsing same modules shared by different images and layers, by using hash value of a module file as a key to index, loaded modules, to avoid duplicate module content.

Figure 5:
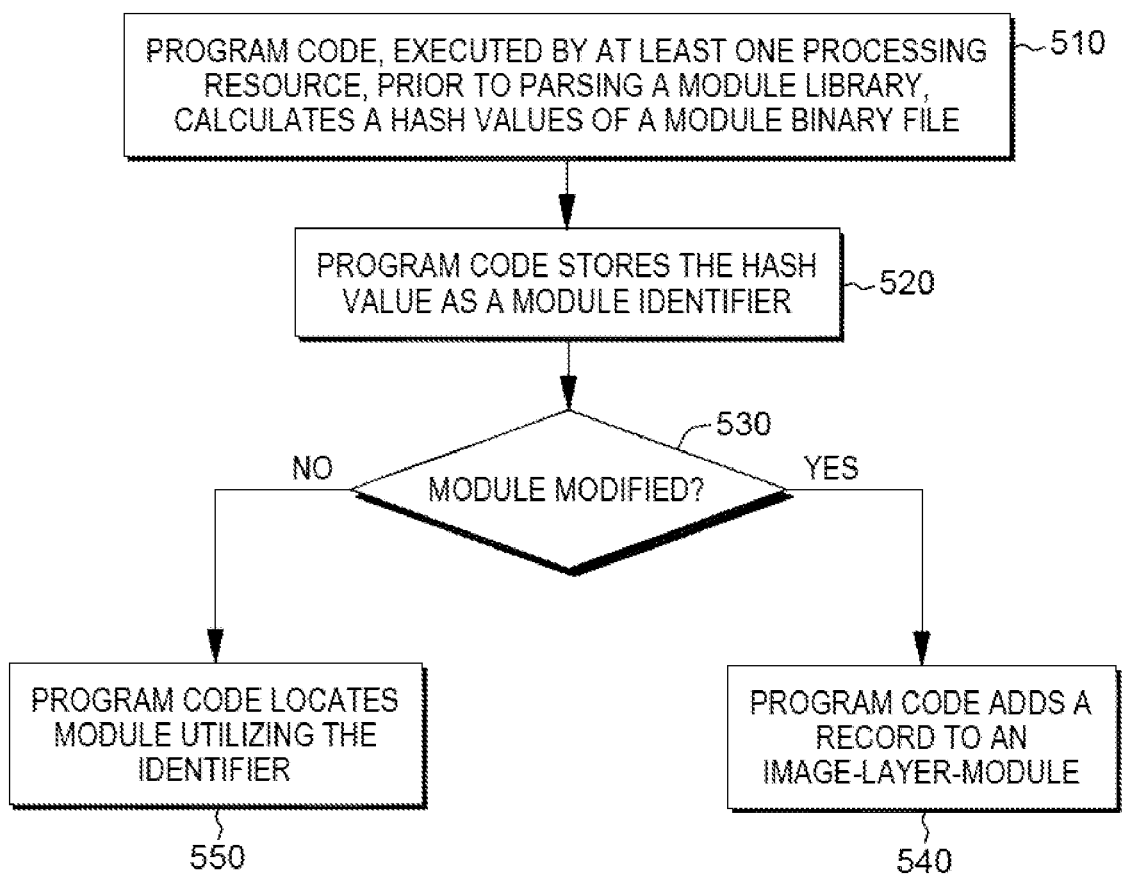
FIG. 5 is a workflow illustrating certain aspects of an embodiment of the present invention.

FIG. 5 is a workflow 500 that illustrates aspects of program code in embodiments of the present invention parsing binary bytes of a module, in a manner that minimizes duplication and therefore, the overhead involved in parsing module binaries which have same content, but are used by multiple (e.g., thousands of) containers. In some embodiments of the present invention, the program code, executed by at least one processing resource, prior to parsing a module library, calculates a hash values of a module binary file (510). The program code stores the hash value as a module identifier (520). The program code parses the content of the (now) identifier-linked module, as part of the parsing the program code determines if the module has been modified (530). Because the program code has associated the content of a module with an identifier, the program code has memorialized (retained) the parsing of the contents of this module and will not repeat parsing of the same content. If the program code determines that the module has not been modified, the program code adds a record to an image-layer-module (540). The record may include identifiers for an image, a topmost layer, a module path, and the hash value of module file. If there is another module file from same image or same layer but from a different container, the program code obtains the module hash value from image-layer-module table directly, instead of locating the module again. In embodiments of the present invention, the program code may retain relationships between images and modules by generating one or more of an image-layer-module table and/or an image-module table. The ability to cross-reference an image to a module is useful at least because it is common, in multiple container computing environments, to have multiple containers using same image. For example, these containers can be used for active, standby, or load balancing. Additionally, in some technical environments, the multiple containers include images based on common layers like debian and/or Ubuntu. If the program determines that the module has not been modified, the program code locates the module utilizing the identifier (550).

Figure 6:
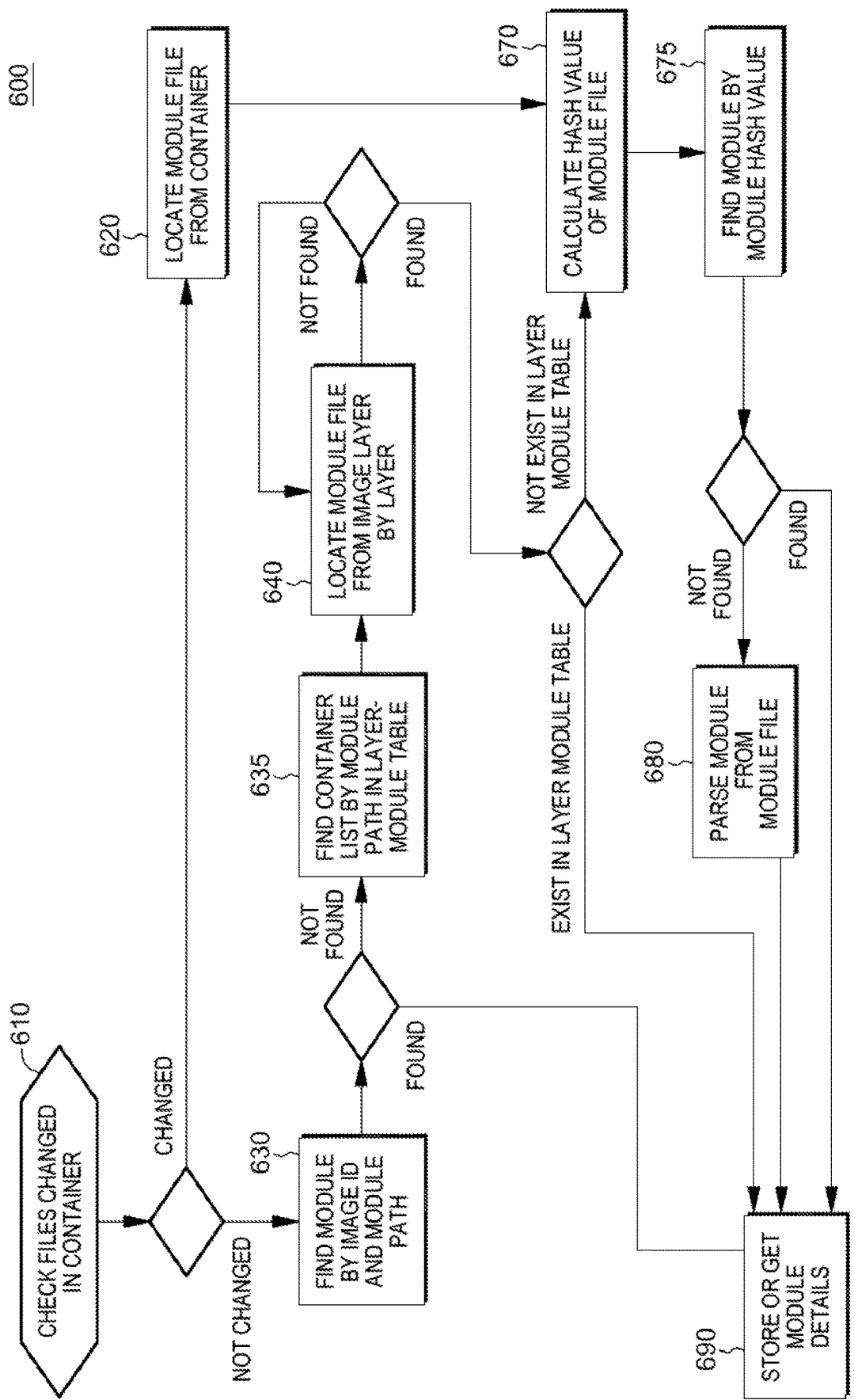
FIG. 6 is a workflow illustrating certain aspects of an embodiment of the present invention.

As illustrated in FIG. 5 and also in upcoming FIG. 6, in embodiments of the present invention, the program code utilizes a digest value (e.g., hash value) of a module file as unique module identifier, based on the inheritance relationship of images, layers, to avoid duplicate work and resource overhead for the same modules. To this end, the program code: 1) parses the module; 2) copies the module file; 3) calculates the digest value; and 4) keeps module content in memory and in result files, etc.

FIG. 6 is a workflow 600 that illustrates, how program code, in some embodiments of the present invention, obtains module details for each module, for use in performance sampling, to identify how each application's performance is affected by critical changes in topology, code and attributes. In an embodiment of the present invention, the program code checks a module to determine if the module has been modified in a container (610). If the program code determines that the module has been modified, the program code fetches a module file for the module from a container layer of the container (620). If the program code determines that the module has not been modified, the program code obtains the module file of the module from an image (e.g., utilizing an image identifier and image path) (630). In some embodiments of the present invention, in order to determine if a module has been modified, the program code utilizes an API (e.g., docker API) to get a list of files that have been modified in the container. As it is possible for several containers to have the same file in their container layers (because package manager like yum, zapper, npm and pip are widely used), the program code generates a unique identifier for the obtained module file, to avoid duplication in parsing the same file more than once, based on the file being resident in more than one container.

Returning to FIG. 6, as aforementioned, the program code determine that the module has been modified (610) and based on this determination, the program code locates the module file from the container layer (620). If the program code determines that the module was modified by getting the list of changed files, as discussed above, the program code can obtain the module file from the container utilizing an API to access an archive of the container (e.g., the get_archive API). This get is not processing intensive because the container layer (e.g., FIG. 3, 330) is generally thin.

Provided that the program code determines that the module has been modified (610), and the program code has located the module file from the container layer (620), the program code calculates a hash value of the module file based on content of the module file (670). The hash value provides a unique identifier for the contents of the module file, so that the same contents can be identified, even if they are resident in a different container. The hash value is a digest value of module file, which the program code utilizes as module identifier to avoid repeatedly parsing same module file and keeping multiple copies of module. The program code determines whether the hash value is in a module content map (675). To determine whether the hash value is in a module content map, the program code attempts to find the module file by utilizing the module hash value. If the hash value does not exist in the module content map, the program code parses the module file (680) and stores the hash value as an identifier of the module file in the content map (690). If the hash value does exist in the module content map, the program code need not parse the module file, as it would be duplicative. Rather, the program code can obtain the module file details from the content map (690). As will be discussed herein, the module content map in various embodiments of the present invention may be comprised of various relationship tables or data objects, including but not limited to, those of FIGS. 7-10.

For example, FIG. 7 is an example of a module content table (e.g., part of the module content map), where a module file can be identified, by the program code, utilizing the module identifier. The table cross-references each module file, by identifying digest or has value, with identifying details about the module file, including but not limited to, module object, module path, symbols, bytes, and source data. Program code in embodiments of the present invention can utilize this table (updating the table when parsing new module files) to avoid duplication of efforts in future performance monitoring.

Returning to FIG. 6, as aforementioned, the program code can determine that the module has not been modified (610) and based on this determination, the program code locates the module file from an image (630). The program code attempts to locate the module file utilizing an image identifier and a module path as a key to locating the module file in an image-layer (e.g., FIG. 3, 320) module table. In embodiments of the present invention, the program code utilizes an image-module identifier table to avoid copying the same files and calculating module identifier multiple times for containers using same image. Thus, the program code can find an identifier for a module by image identifier and module path. The program code can look up a module parsing result from a module identifier-module table.

FIG. 8 is an example of an image-module identifier table. The table stores the relationship between an image identifier, a module path, and a module identifier (e.g., the hash value or digest), so that the program code can locate these values. Program code in embodiments of the present invention can utilize this table (updating the table when parsing new module files) to avoid duplication of efforts in future performance monitoring.

Returning to FIG. 6, if the program code locates the module file (utilizing an image identifier and a module path as a key), the program code utilizes this data to obtain the module file details (690). When the program code does not locate the module file utilizing an image identifier and a module path as a key to locating the module file in an image-layer, the program code obtains a container list by module path in a layer-module table (635) and locates the module file itself, if possible, from the image layer, by layer (640). In some embodiments of the present invention, to determine if a module file does exist in the layer-module table, the program code utilizes a layer-module identifier table to avoid copying same files and calculating module identifiers multiple times for containers using same image layers. Then, as illustrated in FIG. 6, the program code finds module identifier lists and utilizing a module path, cycles through the layer identifiers of the image from top to bottom (640) (e.g., FIG. 3, 320), and stops at a matched layer. Also, if the program code determines the module file does exist in the layer-module table (640), the program code will obtain the module file details from the content map (690).

FIG. 9 is an example of a layer-module identifier table, where the relationships between layer identifiers and module paths are stored by module identifier (hash value, digest). Program code in embodiments of the present invention can utilize this table (updating the table when parsing new module files) to avoid duplication of efforts in future performance monitoring.

Some embodiments of the present invention provide a short cut for searching for module files across layers as the program code can utilize an image relationship table to avoid searching the same files in a common layer stack, which are shared between images. The program code utilizes a result from an image which has common layers, directly. FIG. 10 is an example of an image relationship table that memorializes the relationships of images to shared layers, which is utilized by program code in embodiments of the present invention.

Returning to FIG. 6, the program code, determining that the module file does not exist in the layer-module table (640), will calculate a hash value of the module file based on content of the module file (670). The program code determines whether the hash value is in a module content map (675). If the hash value does not exist in the module content map, the program code parses the module file (680) and stores the hash value as an identifier of the module file in the content map (690). If the hash value does exist in the module content map, the program code obtains the module file details from the content map (690).

Embodiments of the present invention include a computer-implemented method, a computer program product, and a computer system that comprise program code executed by one or more processors that parse, in a computing environment comprised of multiple containers comprising modules, a module originating from a given container in the computing environment. The parsing includes the program code copying various identifying aspects of a module file comprising the module and calculating, based on contents of the module file, a digest value as a unique identifier for the module file. The program code stores the various identifying aspects of the module file and the digest value in one or more memory objects, where the one or more memory objects comprise a module content map to correlate the unique identifier for the module file with the contents of the module, images in the module file with the unique identifier for the module file, and layers with the unique identifier for the module file.

In some embodiments of the present invention, the program code checks the module to determine if the module file has been modified in the given container. The program code determines that the module file has been modified. The program code fetches the modified module file from a container layer of the given container. The program code calculates, based on the contents of the modified module file, a new digest value for the modified module file, as a new unique identifier for the modified module file. The program code determines that the new unique identifier was previously stored the module content map. Based on determining that the new unique identifier was previously stored the module content map, the program code obtains the modified module file details from the module content map.

In some embodiments of the present invention, the program code checks the module to determine if the module file has been modified in the given container. The program code determines that the module file has been modified. The program code fetches the modified module file from a container layer of the given container. The program code calculates based on the contents of the modified module file, a new digest value for the module file, as a new unique identifier for the module file. The program code determines that the new unique identifier was not previously stored the module content map. Based on determining that the new unique identifier was not previously stored the module content map, the program code parses the modified module file. The program code stores the various identifying aspects in the parsed contents of the modified module file and the new digest value in the module content map.

In some embodiments of the present invention, the program code checks the module to determine if the module file has been modified in the given container. The program code determines that the module file has not been modified. The program code accesses a first data object of the data objects comprising the module content map, where the first data object correlates one or more images with module files, based on unique identifiers of the module files, to determine if the module file is correlated with an image. Based on determining that the module file is correlated with the image, the program code obtains the module file details from the module content map. In some of these embodiments of the present invention, the module file is correlated with an image based on a unique identifier of the module file being correlated, in the first data object, with an image identifier and a module path.

In some embodiments of the present invention the program code checks the module to determine if the module file has been modified in the given container. The program code determines that the module file has not been modified. The program code accesses a first data object of the data objects comprising the module content map, where the first data object correlates one or more images with module files, based on unique identifiers of the module files, to determine if the module file is correlated with an image in the first data object. Based on determining that the module file is not correlated with the image in the first data object, the program code obtains a second data object of the data objects comprising the module content map, where the second data object correlates one or more image layers and module paths with the unique identifiers of the module files, to determine if the module file is identified in the second data object. Based on determining that the module file is identified in the second data object, the program code obtains the module file details from the module content map. In some of these embodiments of the present invention, the program code determining if the module file is identified in the second data object comprises: the program code cycling through layer identifiers of the image layers, from top to bottom, to determine, for each image layer, if the unique identifier of the module file correlates with the image layer in the second data object, where the cycling comprises the program code ceasing the cycling based on locating an image layer that correlates with the unique identifier in the second data object. In some of these embodiments, the program code commences the cycling with a top layer of the image layers.

In some embodiments of the present invention, the program code checks the module to determine if the module file has been modified in the given container. The program code determines that the module file has not been modified. The program code accesses a first data object of the data objects comprising the module content map, where the first data object correlates one or more images with module files, based on unique identifiers of the module files, to determine if the module file is correlated with an image in the first data object. Based on determining that the module file is not correlated with the image in the first data object, the program code obtains a second data object of the data objects comprising the module content map, where the second data object correlates one or more image layers and module paths with the unique identifiers of the module files, to determine if the module file is identified in the second data object. Based on determining that the module file is not identified in the second data object, the program code calculates, based on the contents of the modified module file, a new digest value for the module file, as a new unique identifier for the module file. The program code determines that the new unique identifier was not previously stored the module content map. Based on determining that the new unique identifier was not previously stored the module content map, the program code parses the modified module file. The program code stores the various identifying aspects in the parsed contents of the modified module file and the new digest value in the module content map.

In some embodiments of the present invention, the program code checks the module to determine if the module file has been modified in the given container. The program code determines that the module file has not been modified. The program code accesses a first data object of the data objects comprising the module content map, where the first data object correlates one or more images with module files, based on unique identifiers of the module files, to determine if the module file is correlated with an image in the first data object. Based on determining that the module file is not correlated with the image in the first data object, the program code obtains a second data object of the data objects comprising the module content map, where the second data object correlates one or more image layers and module paths with the unique identifiers of the module files, to determine if the module file is identified in the second data object. Based on determining that the module file is not identified in the second data object, the program code calculates, based on the contents of the modified module file, a new digest value for the modified module file, as a new unique identifier for the modified module file. The program code determines that the new unique identifier was previously stored the module content map. Based on determining that the new unique identifier was previously stored the module content map, the program code obtains the modified module file details from the module content map.

Referring now to FIG. 11, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention host 100 (FIG. 1) and host 200 (FIG. 2) can each be understood as a cloud computing node 10 (FIG. 11) and if not a cloud computing node 10, then one or more general computing nodes that include aspects of the cloud computing node 10. Various examples of these resources may, together, comprise a hybrid cloud.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
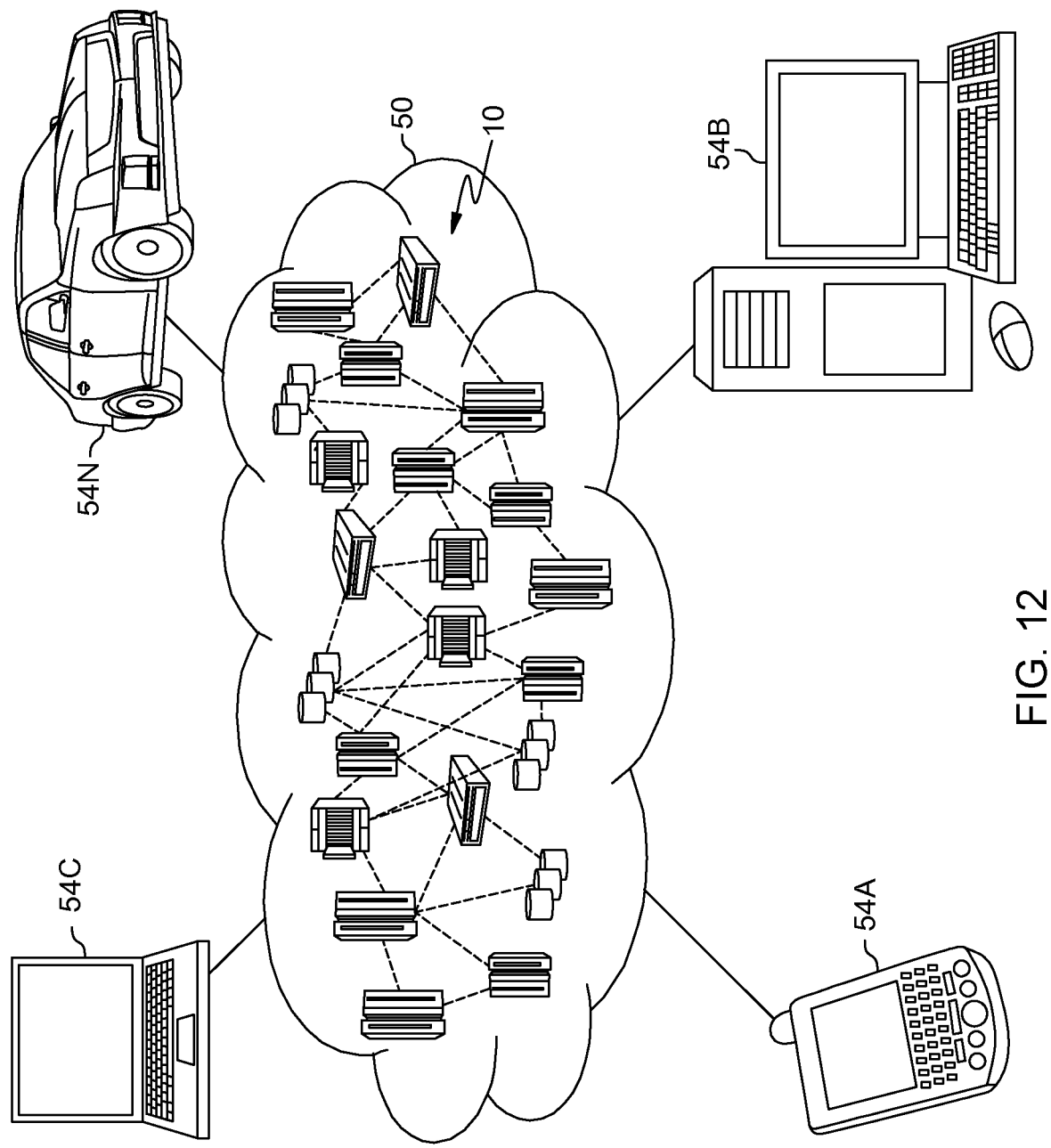
FIG. 12 depicts a cloud computing environment according to an embodiment of the present invention.

Referring now to FIG. 12, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud computing environment 50 can communicate with any type of computerized device over any type of network and/or network addressable connection (e.g., using a web browser).

Figure 13:
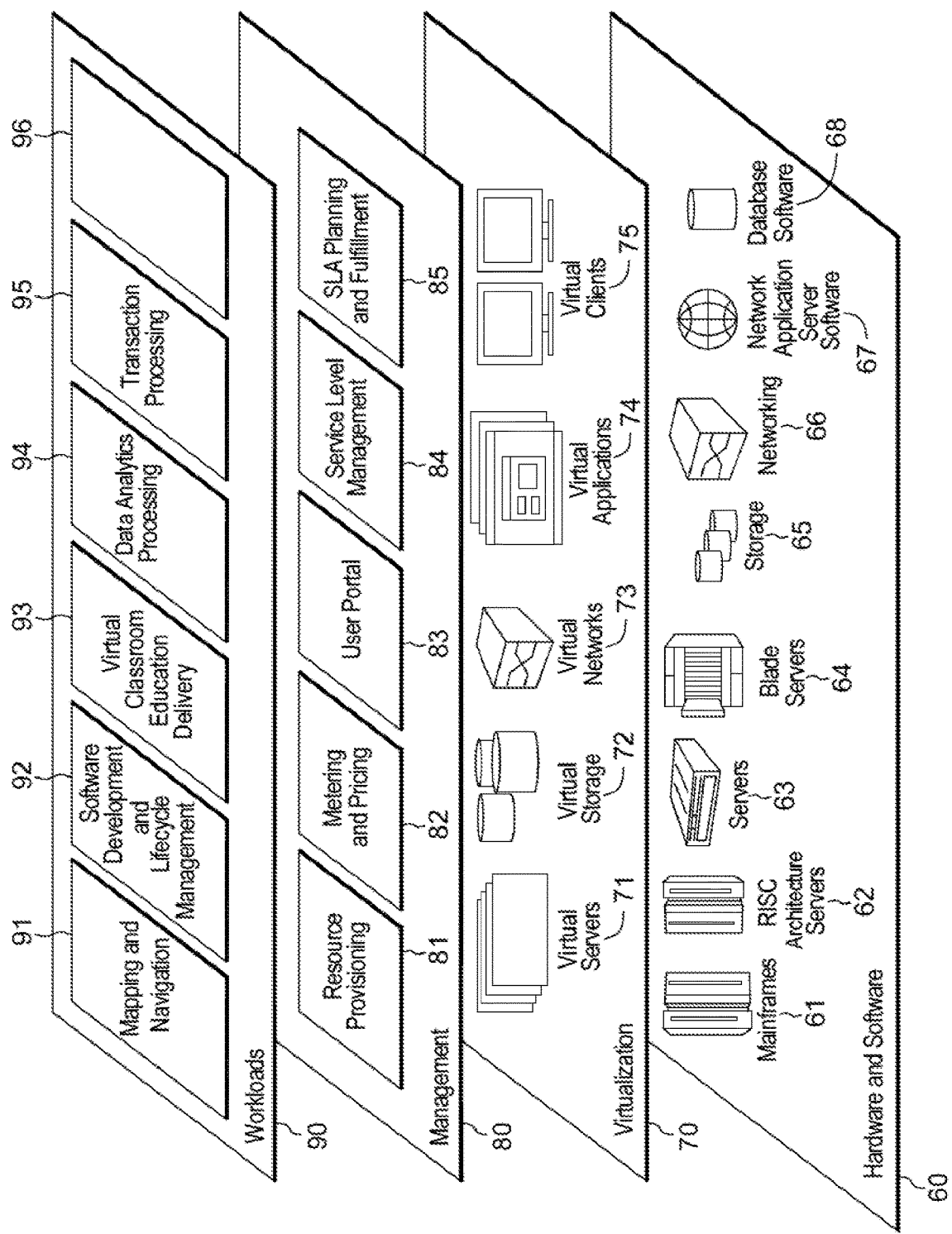
FIG. 13 depicts abstraction model layers according to an embodiment of the present invention.

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and performance sampling in computing environments that include more than one container 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
    storing, by one or more processors, in one or more memory objects in a database table, various identifying aspects of a module file of a module and a unique identifier, wherein the module originated from a given docker container in a computing environment comprised of multiple docker containers, wherein the one or more memory objects comprise a module content map to correlate the unique identifier for the module file with contents of the module;

initiating, by the one or more processors, performance monitoring of the computing environment, wherein the performance monitoring comprises utilizing the database table to avoid duplicative monitoring of an element of the module file within a context of tasks or activities within the computing environment, based on accessing the database table based on the unique identifier;

checking, by the one or more processors, the module to determine if the module file has been modified in the given docker container;

based on determining that the module file has been modified, calculating, by the one or more processors, based on the contents of the modified module file, a new unique identifier for the modified module file; and based on determining that the module file has not been modified, determining, by the one or more processors, if the module file is correlated with an image in a first data object of the data objects comprising the module content map.

2. The computer-implemented method of claim 1, wherein calculating the new unique identifier comprises:

fetching, by the one or more processors, the modified module file from a docker container layer of the given docker container.

3. The computer-implemented method of claim 1, wherein determining that the module file has not been modified further comprises accessing the first data object.

4. The computer-implemented method of claim 1, wherein the unique identifier is a digest value calculated based on the contents of the module file.

5. The computer-implemented method of claim 1, wherein the element of the module file is selected from the group consisting of: a portion of the content of the module, an image in the module file, and a layer of the module file.

6. The computer-implemented method of claim 1, wherein the module content map correlates images in the module file with the unique identifier for the module file and layers with the unique identifier for the module file.

7. The computer-implemented of claim 1, wherein based on determining that the module file has been modified, the method further comprises:

determining, by the one or more processors, that the new unique identifier was previously stored the module content map; and based on determining that the new unique identifier was previously stored the module content map, obtaining, by the one or more processors, the modified module file details from the module content map.

8. The computer-implemented of claim 1, wherein based on determining that the module file has been modified, the method further comprises:

determining, by the one or more processors, that the new unique identifier was not previously stored the module content map;

based on determining that the new unique identifier was not previously stored the module content map, parsing, by one or more processors, the modified module file; and storing, by the one or more processors, the various identifying aspects in the parsed contents of the modified module file and the new digest value in the module content map.

9. The computer-implemented method of claim 1, wherein based on determining that the module file has not been modified, the method further comprises:

based on determining that the module file is correlated with the image, obtaining, by the one or more processors, the module file details from the module content map.

10. The computer-implemented method of claim 1, wherein based on determining that the module file has not been modified, the method further comprises:

based on determining that the module file is not correlated with the image in the first data object, obtaining, by the one or more processors, a second data object of the data objects comprising the module content map, wherein the second data object correlates one or more image layers and module paths with the unique identifiers of the module files, to determine if the module file is identified in the second data object; and based on determining that the module file is identified in the second data object, obtaining, by the one or more processors, the module file details from the module content map.

11. The computer-implemented method of claim 10, wherein determining if the module file is identified in the second data object comprises:

cycling through layer identifiers of the one or more image layers, where the cycling commences with a top layer of the image layers, to determine, for each image layer, if the unique identifier of the module file correlates with the image layer in the second data object, wherein the cycling comprises ceasing the cycling based on locating an image layer that correlates with the unique identifier in the second data object.

12. A computer program product comprising:

a computer readable storage medium readable by one or more processors and storing instructions for execution by the one or more processors for performing a method comprising:

storing, by the one or more processors, in one or more memory objects in a database table, various identifying aspects of a module file of a module and a unique identifier, wherein the module originated from a given docker container in a computing environment comprised of multiple docker containers, wherein the one or more memory objects comprise a module content map to correlate the unique identifier for the module file with contents of the module;

initiating, by the one or more processors, performance monitoring of the computing environment, wherein the performance monitoring comprises utilizing the database table to avoid duplicative monitoring of an element of the module file within a context of tasks or activities within the computing environment, based on accessing the database table based on the unique identifier;

checking, by the one or more processors, the module to determine if the module file has been modified in the given docker container;

based on determining that the module file has been modified, calculating, by the one or more processors, based on the contents of the modified module file, a new unique identifier for the modified module file; and based on determining that the module file has not been modified, determining, by the one or more processors, if the module file is correlated with an image in a first data object of the data objects comprising the module content map.

13. The computer program product of claim 12, wherein calculating the new unique identifier comprises:

fetching, by the one or more processors, the modified module file from a docker container layer of the given docker container.

14. The computer program product of claim 12, wherein determining that the module file has not been modified further comprises accessing the first data object.

15. The computer program product of claim 12, wherein the unique identifier is a digest value calculated based on the contents of the module file.

16. The computer program product of claim 12, wherein the element of the module file is selected from the group consisting of: a portion of the content of the module, an image in the module file, and a layer of the module file.

17. The computer program product of claim 1, wherein the module content map correlates images in the module file with the unique identifier for the module file and layers with the unique identifier for the module file.

18. The computer program product of claim 1, wherein based on determining that the module file has been modified, the method further comprises:
  determining, by the one or more processors, that the new unique identifier was previously stored the module content map; and
  based on determining that the new unique identifier was previously stored the module content map, obtaining, by the one or more processors, the modified module file details from the module content map.

19. The computer program product of claim 12, wherein based on determining that the module file has been modified, the method further comprises:
  determining, by the one or more processors, that the new unique identifier was not previously stored the module content map;
  based on determining that the new unique identifier was not previously stored the module content map, parsing, by one or more processors, the modified module file; and
  storing, by the one or more processors, the various identifying aspects in the parsed contents of the modified module file and the new digest value in the module content map.

20. A system comprising:
a memory;
one or more processors in communication with the memory;
program instructions executable by the one or more processors via the memory to perform a method, the method comprising:
  storing, by the one or more processors, in one or more memory objects in a database table, various identifying aspects of a module file of a module and a unique identifier, wherein the module originated from a given docker container in a computing environment comprised of multiple docker containers, wherein the one or more memory objects comprise a module content map to correlate the unique identifier for the module file with contents of the module;
  initiating, by the one or more processors, performance monitoring of the computing environment, wherein the performance monitoring comprises utilizing the database table to avoid duplicative monitoring of an element of the module file within a context of tasks or activities within the computing environment, based on accessing the database table based on the unique identifier;
  checking, by the one or more processors, the module to determine if the module file has been modified in the given docker container;
  based on determining that the module file has been modified, calculating, by the one or more processors, based on the contents of the modified module file, a new unique identifier for the modified module file; and
  based on determining that the module file has not been modified, determining, by the one or more processors, if the module file is correlated with an image in a first data object of the data objects comprising the module content map.

* * * * *